(12) United States Patent
Liu

(10) Patent No.: US 11,836,197 B2
(45) Date of Patent: Dec. 5, 2023

(54) SEARCH PROCESSING METHOD AND APPARATUS BASED ON CLIPBOARD DATA

(71) Applicant: BAIDU ONLINE NETWORK TECHNOLOGY (BEIJING) CO., LTD., Beijing (CN)

(72) Inventor: Junqi Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 67 days.

(21) Appl. No.: 16/722,657

(22) Filed: Dec. 20, 2019

(65) Prior Publication Data

US 2020/0242178 A1   Jul. 30, 2020

(30) Foreign Application Priority Data

Jan. 30, 2019   (CN) .......................... 201910094215.7

(51) Int. Cl.
*G06F 16/9532* (2019.01)
(52) U.S. Cl.
CPC .................. *G06F 16/9532* (2019.01)
(58) Field of Classification Search
CPC ................................................ G06F 16/9532
See application file for complete search history.

(56) References Cited

U.S. PATENT DOCUMENTS

| | | | |
|---|---|---|---|
| 2005/0222981 A1* | 10/2005 | Lawrence | G06F 16/951 707/E17.108 |
| 2008/0033919 A1* | 2/2008 | Arrouye | G06F 16/907 707/999.003 |
| 2009/0157640 A1* | 6/2009 | Signorini | G06F 16/353 707/E17.108 |

(Continued)

FOREIGN PATENT DOCUMENTS

| | | |
|---|---|---|
| CN | 103123624 A | 5/2013 |
| CN | 103678704 A | 3/2014 |

(Continued)

OTHER PUBLICATIONS

Office Action for Chinese Application No. 201910094215.7, dated Jul. 2, 2020, 15 pages (Continued)

*Primary Examiner* — Kannan Shanmugasundaram
(74) *Attorney, Agent, or Firm* — Lippes Mathias LLP

(57) ABSTRACT

The present disclosure provides a search processing method and apparatus based on clipboard data. The method includes: in response to monitoring that the first data obtained from a search box comes from a clipboard, performing an identification process on first data in the search box to obtain a plurality of second data included in the first data and a type of each second data; determining search data corresponding respectively to the plurality of second data according to the type of each second data; displaying the search data corresponding respectively to the plurality of second data and determining target search data according to operations of a (Continued)

obtaining and displaying supplementary data returned by a server and associated with the target search data — 201 updating the target search data according to operations of the user on the supplementary data to obtain updated target search data — 202 user on the search data corresponding respectively to the plurality of second data; and obtaining a search result according to the target search data.

17 Claims, 3 Drawing Sheets

(56) References Cited

U.S. PATENT DOCUMENTS

| | | | | |
|---|---|---|---|---|
| 2010/0198768 A1* | 8/2010 | Zhou | .................. | G06F 9/453 |
| | | | | 715/812 |
| 2012/0191756 A1* | 7/2012 | Son | .................. | G06F 16/9535 |
| | | | | 707/780 |
| 2014/0013258 A1* | 1/2014 | Jang | .................. | G06F 3/0488 |
| | | | | 715/769 |
| 2016/0306898 A1 | 10/2016 | Yoo et al. | | |
| 2017/0060355 A1* | 3/2017 | Padmanabhan | ....... | G06F 3/0486 |

FOREIGN PATENT DOCUMENTS

| | | |
|---|---|---|
| CN | 106844484 A | 6/2017 |
| CN | 107220306 A | 9/2017 |
| JP | 2008077353 A | 4/2008 |
| JP | 2012212377 A | 11/2012 |
| JP | 2013176089 A | 9/2013 |

OTHER PUBLICATIONS

Office Action for Chinese Application No. 201910094215.7, dated Dec. 10, 2020, 23 pages.
Office Action for Japanese Application No. 2019-215914, dated Dec. 21, 2020, 8 pages.

* cited by examiner

SEARCH PROCESSING METHOD AND APPARATUS BASED ON CLIPBOARD DATA

This application is based on and claims priority of Chinese Patent Application 201910094215.7, filed on Jan. 30, 2019, the entire contents of which are incorporated herein by reference.

TECHNICAL FIELD

The present disclosure relates to a field of Internet technologies, and more particularly, to a search processing method and apparatus based on clipboard data.

BACKGROUND

With the development of Internet technologies, search engines provide great convenience for users' lives. Users can search by entering keywords or by utilizing contents on a clipboard. However, when there are a lot of contents on the clipboard, if the content in the clipboard is directly used for searching, an accuracy of a search result may be reduced.

SUMMARY

Embodiments of the present disclosure provide a search processing method based on clipboard data for solving a technical problem in the related art that an accuracy of a search result may be reduced by utilizing content in a clipboard directly for searching when there are a lot of contents on the clipboard.

Embodiments of a first aspect in the present disclosure provide a search processing method based on clipboard data, includes: in response to monitoring that the first data obtained from a search box comes from a clipboard, performing an identification process on first data in the search box to obtain a plurality of second data included in the first data and a type of each second data; determining search data corresponding respectively to the plurality of second data according to the type of each second data; displaying the search data corresponding respectively to the plurality of second data and determining target search data according to operations of a user on the search data corresponding respectively to the plurality of second data; and obtaining a search result according to the target search data.

With the search processing method based on clipboard data according to the embodiments of the present disclosure, an identification process is performed on first data in the search box to obtain a plurality of second data included in the first data and a type of each second data, search data corresponding respectively to the plurality of second data is determined according to the type of each second data, the search data corresponding respectively to the plurality of second data is displayed to determine target search data according to operations of a user on the search data corresponding respectively to the plurality of second data, and a search result is obtained according to the target search data. In this way, when search is performed based on the data in the clipboard, the search data is determined according to the types of the data included in the data of the clipboard and the search data is displayed to the user, then the search is performed according to the search data selected by the user. Therefore, not only the search accuracy is improved, but also the search efficiency is improved since the user does not need to manually delete redundant data from the search box.

Embodiments of a second aspect in the present disclosure provide a search processing apparatus based on clipboard data, includes: a first obtaining module, configured to, in response to monitoring that the first data obtained from a search box comes from a clipboard, perform an identification process on first data in a search box to obtain a plurality of second data included in the first data and a type of each second data; a first determining module, configured to determine search data corresponding respectively to the plurality of second data according to the type of each second data; a displaying module, configured to display the search data corresponding respectively to the plurality of second data to determine a target search data according to operations of a user on the search data corresponding respectively to the plurality of second data; and a second obtaining module, configured to obtain a search result according to the target search data.

With the search processing apparatus based on clipboard data according to the embodiments of the present disclosure, an identification process is performed on first data in the search box to obtain a plurality of second data included in the first data and a type of each second data, search data corresponding respectively to the plurality of second data is determined according to the type of each second data, the search data corresponding respectively to the plurality of second data is displayed to determine target search data according to operations of a user on the search data corresponding respectively to the plurality of second data, and a search result is obtained according to the target search data. In this way, when search is performed based on the data in the clipboard, the search data is determined according to the types of the data included in the data of the clipboard and the search data is displayed to the user, such that the user is provided an ability of selecting. Therefore, not only the search accuracy is improved, but also the search efficiency is improved since the user does not need to manually delete redundant data from the search box.

Embodiments of a third aspect in the present disclosure provide a computer device comprising a processor and a memory. When the processor runs a program corresponding to an executable program code by reading the executable program code stored in the memory, the search processing method based on clipboard data according to embodiments of the first aspect is implemented.

Embodiments of a fourth aspect in the present disclosure provide a computer readable storage medium having computer programs stored thereon. When the computer programs are executed by a processor, the search processing method based on clipboard data according to embodiments of the first aspect is implemented.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
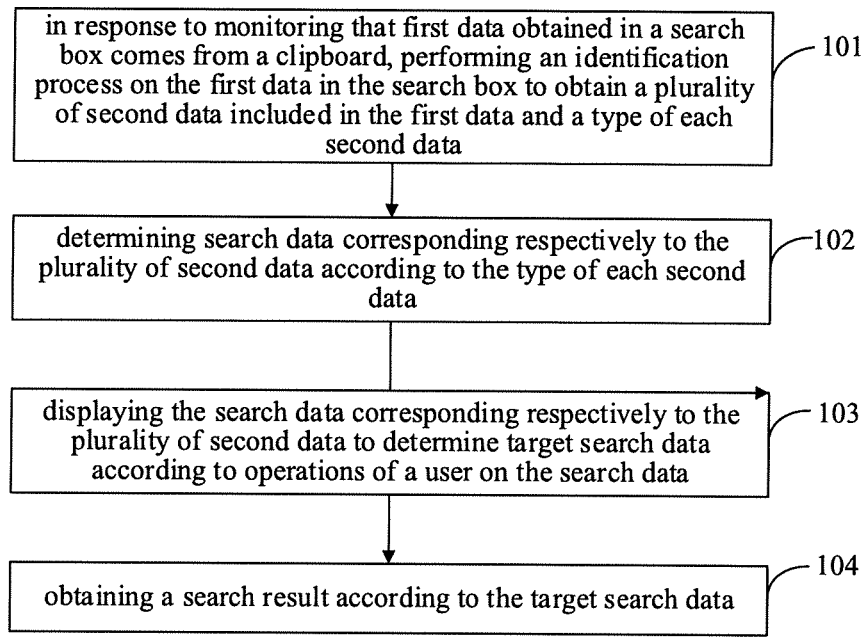
FIG. 1 is a flowchart of a search processing method based on clipboard data according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

A search processing method based on clipboard data and a search processing method apparatus based on clipboard data according to an embodiment of the present disclosure are described below with reference to the accompanying drawings.

FIG. 1 is a flowchart of a search processing method based on clipboard data according to an embodiment of the present disclosure.

The search processing method based on clipboard data according to the embodiments of the present disclosure can be applied to a search-type application, which can be executed by the search processing apparatus based on clipboard data according to the embodiments of the present disclosure. The apparatus can be configured in a computer device. When search is performed based on data in a clipboard, search data is determined according to types of data included in the data of the clipboard and the search data is displayed to a user, such that the user is provided an ability of selecting. Therefore, not only the search accuracy is improved, but also the search efficiency is improved since the user does not need to manually delete redundant data from the search box.

As illustrated in FIG. 1, the search processing method based on clipboard data includes the following steps.

At block 101, in response to monitoring that first data obtained in a search box comes from a clipboard, an identification process is performed on the first data in the search box to obtain a plurality of second data included in the first data and a type of each second data.

In practical applications, when searching using a search-type application, the user can paste copied content into the search box for searching. However, when there is too much data in the clipboard, for example, including different types of data, such as URL, text, and pictures, if the search is directly performed according to the pasted content, the search-type application may perform the search only according to text in the pasted content, or redirect to the URL, such that the search result may be not desired by the user and the accuracy of the search result is low. The user can also manually delete redundant data and perform the search according to remaining data, however, in this way, manual operations of the user are required, which is cumbersome and increases the time of the entire search process, leading to a low search efficiency.

In the embodiments of the present disclosure, the data source of the search box can be monitored in real time. If a paste operation is monitored in the search box, it indicates that the data in the search box comes from the clipboard. The data in the search box is called first data.

When it is monitored that the first data acquired in the search box comes from the clipboard, the first data in the search box is identified and processed. Specifically, the first data may be traversed to obtain a plurality of second data included in the first data and a type of each second data.

The types to which the second data belongs include, but are not limited to, uniform resource locator data, picture data, and character-type data.

For example, when the first data is "how to write 'biangbiang noodle', reference can be made to https://zhidao.baidu-.com/question/335056406.html", by traversing the first data, "how to write 'biangbiang noodle', reference can be made to" can be regarded as the second data, which is the character-type data, and "https://zhidao.baidu.com/question/335056406.html" can also be regarded as the second data, which is the uniform resource locator data.

When traversing the first data, the content starting with "http", "https" or other websites, such as "m.baidu.com", and conforming to the URL standard may be used as the second data, which is the uniform resource locator data. Successive characters may also be used as the second data, which is the character-type data.

At block 102, search data corresponding respectively to the plurality of second data is determined according to the type of each second data.

Direct search can affect the accuracy of the search result when the data in the search box contains different types of data. In this embodiment, after acquiring the type of each second data and the plurality of second data, according to the type of each second data and an order of the plurality of second data in the first data, the search data corresponding respectively to the plurality of second data can be determined. Certainly, the search data corresponding respectively to the plurality of second data may be determined without considering the order of the plurality of second data in the first data.

In this embodiment, when determining the search data corresponding to the second data according to the type of the second data, the search data corresponding to different types of the second data can be obtained.

At block 103, the search data corresponding respectively to the plurality of second data is displayed to determine target search data according to operations of a user on the search data.

After acquiring the search data corresponding respectively to the plurality of second data, a recommendation list may be generated according to the search data, and displayed on a search interface. Or, the search data is displayed in a tiled form. That is, all of the search data determined according to the plurality of second data can be presented to the user to facilitate the user to select the search data for searching.

When the user selects one of the search data from the displayed search data, the selected search data is configured as the target search data. For example, if the user selects a URL from all of the displayed search data, then the URL is configured as the target search data. For another example, if the user selects a keyword from all the displayed search data, the keyword may be placed in the search box to cover the first data, and the keyword is used as the target search data.

If the user does not select any search data from the displayed search data, the first data in the search box is used as the target search data.

At block 104, a search result is obtained according to the target search data.

After determining the target search data according to the user's operations, the search result may be obtained according to the target search data. For example, if the target search data is a URL, then the webpage is redirected to a page corresponding to the URL. If the target search data is a keyword, then the search is performed according to the keyword to obtain the search result.

With the search processing method based on clipboard data according to the embodiments of the present disclosure, an identification process is performed on first data in the search box to obtain a plurality of second data included in the first data and a type of each second data when monitoring that the first data obtained from the search box comes from a clipboard, search data corresponding respectively to the plurality of second data is determined according to the type of each second data, the search data corresponding respectively to the plurality of second data is displayed to determine target search data according to operations of a user on the search data corresponding respectively to the plurality of second data, and a search result is obtained according to the target search data. In this way, when search is performed based on the data in the clipboard, the data from the clipboard is processed to obtain the search data corresponding to different types of data and display the search data to the user, such that the user is provided an ability of selecting. Therefore, not only the search accuracy is improved, but also the search efficiency is improved since the user does not need to manually delete redundant data from the search box.

In practical applications, the data from the clipboard in the search box may contain a plurality of types of data, in order to extract different types of search data. In an embodiment of the present disclosure, when the search data corresponding to the second data is determined according to the type of the second data, if the second data is the uniform resource locator data, it indicates that the second data is a URL, such that the second data can be determined as the search data. That is, when the first data contains a URL, the URL is extracted from the first data, and the URL is used as the search data.

If the second data is the picture data, i.e., a picture, an image identification process is performed on the second data, and the corresponding text is obtained by identifying content of the picture, and the corresponding text is used as the search data.

For example, if the second data is a picture of an apple, the image identification process is performed on the picture to obtain text "Apple", and the search data corresponding to the picture of the apple is the keyword "Apple".

If the second data is the character-type data, a word segmentation can be performed on the second data according to an existing word segmentation method to determine words corresponding to the second data, and then the words processed by word segmentation are screened. Each word obtained after screening can be used as the search data, or words can be combined to be used as the search data.

As an example, when the words obtained by the word segmentation are screened, the part of speech of each word obtained by the word segmentation may be sequentially determined. The words whose part of speech is not a noun may be screened out, and the remaining words may be used as the search data.

For example, the second data "what are the travel attractions in Beijing?" is subject to the word segmentation, words such as "Beijing", "are", "what", "travel", and "attractions" can be obtained. Through sequentially determining the part of speech of these words, it can be determined that "has" and "travel" are verbs, "what" is a pronoun, "Beijing" and "attractions" are nouns. The words "Beijing" and "attractions" can be used as the search data, respectively. Alternatively, after combing the words "Beijing" and "attractions", "Beijing attractions" is obtained as the search data.

As another example, when screening the words obtained by the word segmentation, the part of speech of each word obtained by the word segmentation may be sequentially determined. The word whose part of speech is the function word such as an adverb, a prep, a conjunction, a modal particle, and the like is screened out, and each word obtained after screening or a combination of those words obtained after screening may be used as the search data.

It should be noted that if the second data is the character-type data, the second data is also used as the search data. For example, if the second data is "what are the travel attractions in Beijing?", then "what are the travel attractions in Beijing?" can also be displayed to the user as the search data, for example, displaying "what are the travel attractions in Beijing?" to the user by displaying "Beijing", "attractions", "Beijing attractions" to the user in the form of a list.

In this embodiment, when the first data from the clipboard in the search box includes different types of data such as a URL and a picture, the URL may be extracted from the first data and provided to the user, or the search data corresponding to other types of data may be provided to the user, so that the user can select the desired search data from the provided search data.

In the embodiments of the present disclosure, the search data corresponding to the second data is determined according to the type of the second data, so that when the data from the clipboard in the search box includes different types of data, the search data corresponding respectively to different types of data may be obtained.

In order to improve a display effect of the search data and facilitate the user to select, in an embodiment of the present disclosure, before displaying the search data corresponding respectively to the plurality of second data, the search data may be sorted first and displayed sequentially.

As a possible implementation, the search data corresponding respectively to the plurality of second data may be sorted according to the order of the plurality of second data in the first data.

For example, the search data corresponding to the plurality of second data is sorted according to the order of the plurality of second data in the first data. If the second data corresponds to a plurality of search data, the plurality of search data may be sorted randomly or sorted according to a preset rule.

For example, the first data includes a URL and character-type data in turn. The URL can be arranged in front of the search data corresponding to the character-type data. If the character-type data corresponds to a plurality of search data, the plurality of the search data can be randomly sorted and arranged after the URL.

For example, if the first data is "https://www.baidu.com/?tn=56060048_3_pg what are the travel attractions in Beijing", the corresponding second data is "https://www.baidu.com/?tn"=56060048_3_pg" and "what are the travel attractions in Beijing", the search data corresponding to the second data "https://www.baidu.com/?tn=56060048_3_pg" is a website and the search data corresponding to "what are the travel attractions in Beijing" includes: "what are the travel attractions in Beijing", "Beijing", "attractions", "Beijing attractions". The website can be ranked in front of the search data corresponding to "what are the travel attractions in Beijing", such as the search data may be ranked as follows, "https://www.baidu.com/?n=56060048_3_pg", "what are the travel attractions in Beijing", "Beijing", "attractions", "Beijing attractions".

As another possible implementation, search frequencies of the search data corresponding respectively to the plurality of second data may also be counted, and the search data corresponding respectively to the plurality of second data is sorted according to the search frequencies.

For example, according to the first data "https://www.baidu.com/?tn=56060048_3_pg what are the travel attractions in Beijing", the search data obtained includes: "https://www.baidu.com/?n=56060048_3_pgh", "what are the travel attractions in Beijing", "Beijing", "attractions", and "Beijing attractions". According to the search frequencies of these search data from high to low, the search data may be ranked as follows "https://www.baidu.com/?n=56060048_3_pgh", "what are the travel attractions in Beijing", "Beijing attractions", "Beijing", "attractions", then when the search data is displayed in the form of a list, these search data can be displayed from top to bottom in the list based on the search frequencies from high to low.

In the embodiments of the present disclosure, before the search data is displayed, the search data is sorted, so that the display of the search data is convenient for the user to select.

Figure 2:
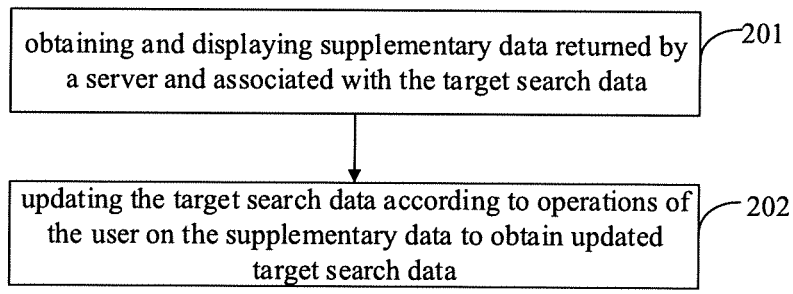
FIG. 2 is a flowchart of a search processing method based on clipboard data according to another embodiment of the present disclosure.

In order to further improve the accuracy of the search result, in an embodiment of the present disclosure, the server may also provide search suggestions after determining the target search data. The following is illustrated in combination with FIG. 2. FIG. 2 is a flowchart of a search processing method based on clipboard data according to another embodiment of the present disclosure.

As shown in FIG. 2, after determining the target search data according to the operations of a user on the search data, the search processing method based on clipboard data further includes the following steps.

At block 201, supplementary data returned by a server and associated with the target search data is obtained and displayed.

After determining the target search data, the server searches for data associated with the target search data as the supplementary data according to the target search data, for example, searching for the data associated with the target search data and having a higher search frequency, and returns the data to the search processing apparatus based on clipboard data. After the search processing apparatus based on clipboard data obtains the supplementary data, the supplementary data may be displayed on the search interface, for example, the supplementary data is displayed in a floating layer manner under the search box.

For example, if the target search data is "Beijing", and the server returns three supplementary data of "Tiananmen", "Forbidden City" and "Great Wall".

At block 202, the target search data is updated according to operations of the user on the supplementary data to obtain updated target search data.

When the user selects one of the supplementary data, the target search data and the selected supplementary data may be used as new target search data to obtain the updated target search data, and the updated target search data is used to obtain the search result. If the user does not select the supplementary data, the search result is obtained directly according to the target search data.

For example, if the target search data is "Beijing" and the supplementary data selected by the user is "Great Wall", the updated target search data may be "Beijing, Great Wall", and the search is performed according to "Beijing, Great Wall" to obtain the search result.

In the embodiments of the present disclosure, the supplementary data associated with the target search data returned by the server is obtained and displayed for the user to select, and the target search data is updated according to the operations of the user on the supplementary data, thereby improving the accuracy of the search result.

Figure 3:
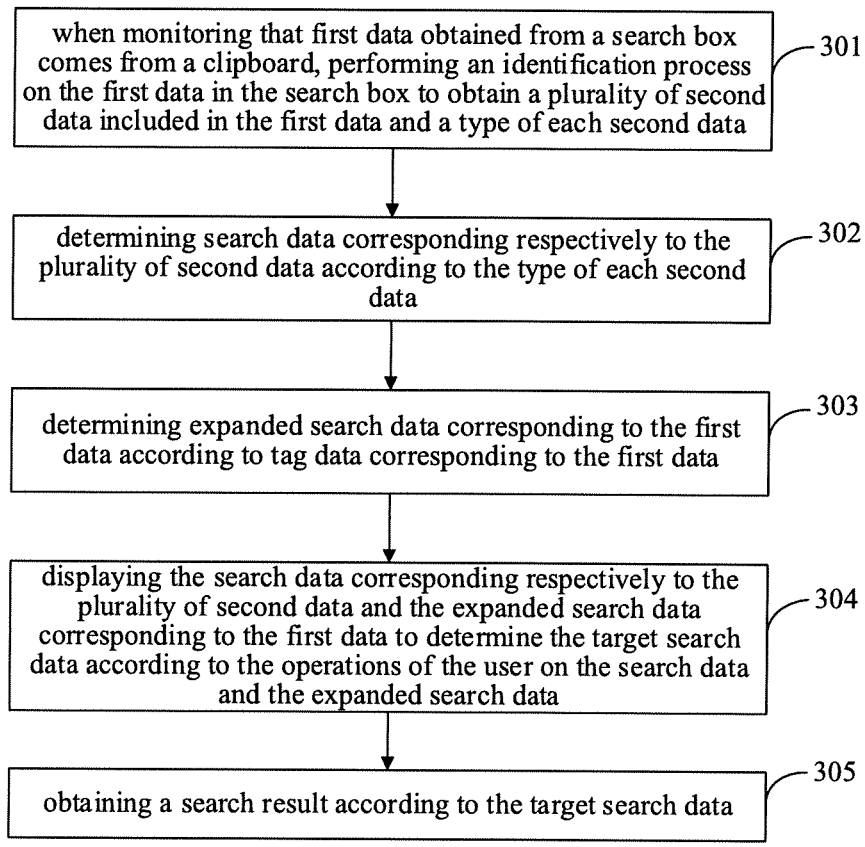
FIG. 3 is a flowchart of a search processing method based on clipboard data according to a further embodiment of the present disclosure.

In practical applications, the content on the clipboard has a certain source. For example, if the content on the clipboard comes from an article, a title of the article can also be used as a search basis. In order to provide more search data, in an embodiment of the present disclosure, the clipboard may further include tag data for representing source information of the first data, and according to the tag data, expanded search data may be determined and provided to the user. The following is illustrated in combination with FIG. 3. FIG. 3 is a flowchart of a search processing method based on clipboard data according to a further embodiment of the present disclosure.

As illustrated in FIG. 3, the search processing method based on clipboard data further includes the following steps.

At block 301, when monitoring that first data obtained from a search box comes from a clipboard, an identification process is performed on the first data in the search box to obtain a plurality of second data included in the first data and a type of each second data.

At block 302, search data corresponding respectively to the plurality of second data is determined according to the type of each second data.

In this embodiment, steps 301-302 are similar to the foregoing steps 101-102, and therefore are not described herein again.

At block 303, expanded search data corresponding to the first data is determined according to tag data corresponding to the first data.

In this embodiment, the clipboard may further include the tag data for representing source information of the first data. For example, if the tag data represents a title of an article from which the first data comes, a word segmentation can be performed on the title and the words obtained by the word segmentation can be screened, then the expanded search data is determined according to each word obtained after screening. For another example, if the tag data indicates that the first data is derived from a certain paragraph of an article, then keywords can be extracted from the paragraph, and the keywords can be used as the expanded search data corresponding to the first data.

For example, if the first data is "October is the best time to go to Xiangshan", and the tag data indicates that the first data comes from the article titled "The scenic spot in Beijing needs to be visited in the autumn", which indicates that the first data comes from the article about the scenic spot that needs to be visited in the autumn at Beijing, the word segmentation is processed on the title of the article, and the words obtained by the word segmentation are screened to obtain the words "Beijing", "autumn", "attractions", then "Beijing", "autumn", "attractions", "Beijing autumn", "Beijing autumn attractions" can be used as the expanded search data.

Therefore, according to the tag data of the first data, the expanded search data corresponding to the first data may be determined according to related information of the first data.

At block 304, the search data corresponding respectively to the plurality of second data and the expanded search data corresponding to the first data are displayed to determine the target search data according to the operations of the user on the search data and the expanded search data.

In this embodiment, a recommendation list may be generated according to all the search data corresponding respectively to the plurality of second data and the expanded search data, and the recommendation list is displayed. Alternatively, according to the search data and the expanded search data, two recommendation lists are generated respectively, and all the search data and all the expanded search data corresponding to the first data are displayed in two lists for displaying.

In this embodiment, the target search data may be determined according to the selection of the search data and the expanded search data by the user. For example, if the user selects the expanded search data, the expanded search data is used as the target search data.

For example, all the search data obtained according to the first search data may be "October is the best time to go to Xiangshan" and "Xiangshan". The expanded search data includes: "Beijing", "autumn", "attractions", these data "October is the best time to go to Xiangshan", "Xiangshan", "Beijing", "autumn", "attractions", "Beijing autumn", "Beijing autumn attractions" can be displayed in the form of a list. If the user selects "Beijing autumn attractions", then "Beijing Autumn attractions" can be used as the target search data.

At block 305, a search result is obtained according to the target search data.

After determining the target search data according to the user's operations, the search result may be obtained according to the target search data. For example, if the target search data is a URL, the webpage can be redirected to a page corresponding to the URL. If the target search data is a keyword, then a search may be performed according to the keyword to obtain the search result.

With the search processing method based on clipboard data according to the embodiments of the present disclosure, the expanded search data corresponding to the first data is determined according to the tag data included in the clipboard for representing a source of the first data, and the expanded search data is displayed. Then the user is provided with the search data related to the first data for the user to select.

In practical applications, for example, when reading a paper, if a knowledge point that is unapprehensive is encountered, the user can paste the knowledge point into the search box to search by copying and pasting operations, it indicates that the user wants to find basic knowledge related to the knowledge point. In order to improve the accuracy of the search, in an embodiment of the present disclosure, the clipboard may further include tag data for representing source information of the first data, according to which the search purpose may be determined, and when using the target search data for searching, the search result is obtained in combination with the search purpose.

Figure 4:
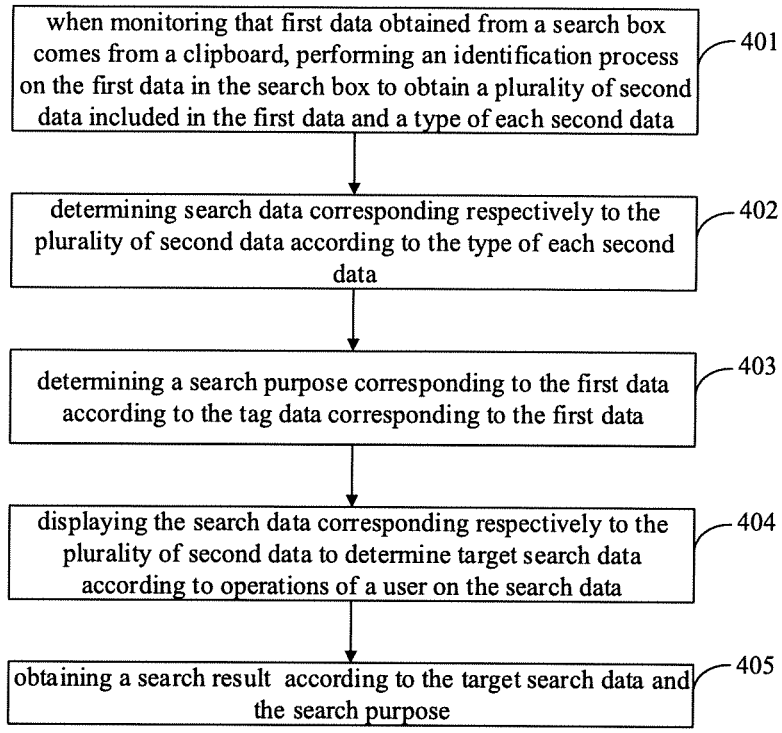
FIG. 4 is a flowchart of a search processing method based on clipboard data according to yet another embodiment of the present disclosure.

The following is illustrated in combination with FIG. 4, FIG. 4 is a flowchart of a search processing method based on clipboard data according to another embodiment of the present disclosure.

As illustrated in FIG. 4, the search processing method based on clipboard data includes the following steps.

At block 401, when monitoring that first data obtained from a search box comes from a clipboard, an identification process is performed on the first data in the search box to obtain a plurality of second data included in the first data and a type of each second data.

At block 402, search data corresponding respectively to the plurality of second data is determined according to the type of each second data.

In this embodiment, steps 401-402 are similar to the foregoing steps 101-102, and therefore are not described herein again.

At block 403, a search purpose corresponding to the first data is determined according to the tag data corresponding to the first data.

In this embodiment, the clipboard may further include the tag data for representing source information of the first data. For example, the tag data is an entertainment Wechat, it indicates that the first data comes from the entertainment Wechat.

Since the tag data represents the source of the first data, the search purpose can be determined based on the source. For example, the tag data indicates that the first data is derived from an entertainment Wechat, and it may be determined that the search purpose corresponding to the first data is to search for entertainment data. For another example, if the tag data indicates that the first data is derived from an academic paper, then it can be determined that the search purpose corresponding to the first data is to search for some basic knowledge.

In this embodiment, the search purpose can be determined according to the tag data for representing the source of the first data included in the clipboard, thereby taking into account the user's search requirements.

It should be noted that, in this embodiment, in step at block 403, an execution order of identifying the first data and determining the search data corresponding respectively to the plurality of second data is not limited.

At block 404, the search data corresponding respectively to the plurality of second data is displayed to determine target search data according to operations of a user on the search data.

In this embodiment, step 404 is similar to step 103 above, and thus is not described herein.

At block 405, a search result is obtained according to the target search data and the search purpose.

When the search is performed according to the target search data, the search result is obtained in combination with the search purpose. For example, if the target search data is a "convolutional neural network" and the search purpose is to search for basic knowledge points, according to the target search data and the search purpose, the basic concepts, principles, application fields, related papers, or the like of the "convolution neural network" can be obtained.

The search processing method based on clipboard data according to the embodiment of the present disclosure determines the search purpose according to the tag data included in the clipboard for representing the source of the first data, which takes the user's search requirement in consideration, thus making the search result obtained more accurate by combining the search purpose and the target search data.

Figure 5:
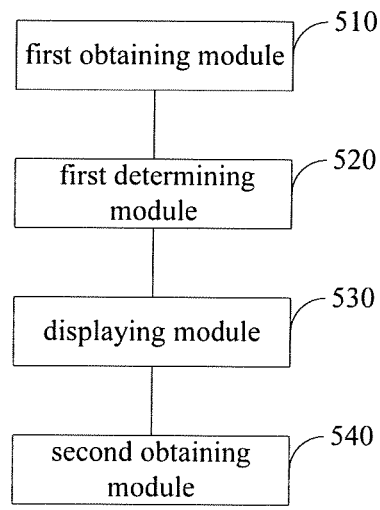
FIG. 5 is a block diagram of a search processing apparatus based on clipboard data according to an embodiment of the present disclosure.

In order to implement the above embodiments, the embodiments of the present disclosure further provide a search processing apparatus based on clipboard data. FIG. 5 is a block diagram of a search processing apparatus based on clipboard data according to an embodiment of the present disclosure.

As illustrated in FIG. 5, the search processing apparatus based on clipboard data includes: a first obtaining module 510, a first determining module 520, a displaying module 530, and a second obtaining module 540.

The first obtaining module 510 is configured to, in response to monitoring that the first data obtained from a search box comes from a clipboard, perform an identification process on the first data in the search box to obtain a plurality of second data included in the first data and a type of each second data.

The first determining module 520 is configured to determine search data corresponding respectively to the plurality of second data according to the type of each second data.

The displaying module 530 is configured to display the search data corresponding respectively to the plurality of second data to determine target search data according to operations of a user on the search data corresponding respectively to the plurality of second data.

The second obtaining module 540 is configured to obtain a search result according to the target search data.

In a possible implementation of the embodiment in the present disclosure, the first determining module 520 is configured to: if the second data belongs to uniform resource locator data, determine the second data as the search data; or, if the second data belongs to picture data, perform an image identification on the second data to determine the search data corresponding to the second data; or, if the second data belongs to character-type data, perform a word segmentation on the second data to determine the search data corresponding to the second data.

In a possible implementation of the embodiment in the present disclosure, the apparatus further includes a sorting module, configured to: sort the search data corresponding respectively to the plurality of second data according to an order of the plurality of second data in the first data; or sort the search data according to search frequencies of the search data corresponding respectively to the plurality of second data.

In a possible implementation of the embodiment in the present disclosure, the apparatus further includes: a third obtaining module, configured to obtain and display supplementary data returned by a server and associated with the target search data; and an updating module, configured to update the target search data according to operations of the user on the supplementary data to obtain updated target search data.

In a possible implementation of the embodiment in the present disclosure, the clipboard further includes tag data representing source information of the first data, and the apparatus further includes: a second determining module, configured to determine expanded search data corresponding to the first data according to the tag data corresponding to the first dat. The displaying module 530 is configured to display the expanded search data corresponding to the first data.

In a possible implementation of the embodiment in the present disclosure, the clipboard further includes tag data representing source information of the first data, and the apparatus further includes: a third determining module, configured to determine a search purpose corresponding to the first data according to the tag data corresponding to the first data. The second obtaining module 540 is configured to obtain the search result according to the search purpose and the target search data.

It should be noted that the above explanation of the embodiment of the search processing method based on clipboard data is also applicable to the search processing apparatus based on clipboard data of the embodiment, and therefore will not be described herein.

With the search processing apparatus based on clipboard data according to the embodiments of the present disclosure, an identification process is performed on first data in the search box to obtain a plurality of second data included in the first data and a type of each second data, search data corresponding respectively to the plurality of second data is determined according to the type of each second data, the search data corresponding respectively to the plurality of second data is displayed to determine target search data according to operations of a user on the search data corresponding respectively to the plurality of second data, and a search result is obtained according to the target search data. In this way, when search is performed based on the data in the clipboard, the search data is determined according to the types of the data included in the data of the clipboard and the search data is displayed to the user, such that the user is provided an ability of selecting. Therefore, not only the search accuracy is improved, but also the search efficiency is improved since the user does not need to manually delete redundant data from the search box.

In order to implement the above embodiments, the embodiments of the present disclosure further provide a computer device, including a processor and a memory.

The processor runs a program corresponding to an executable program code by reading the executable program code stored in the memory for implementing the search processing method based on clipboard data as described in the above embodiments.

Figure 6:
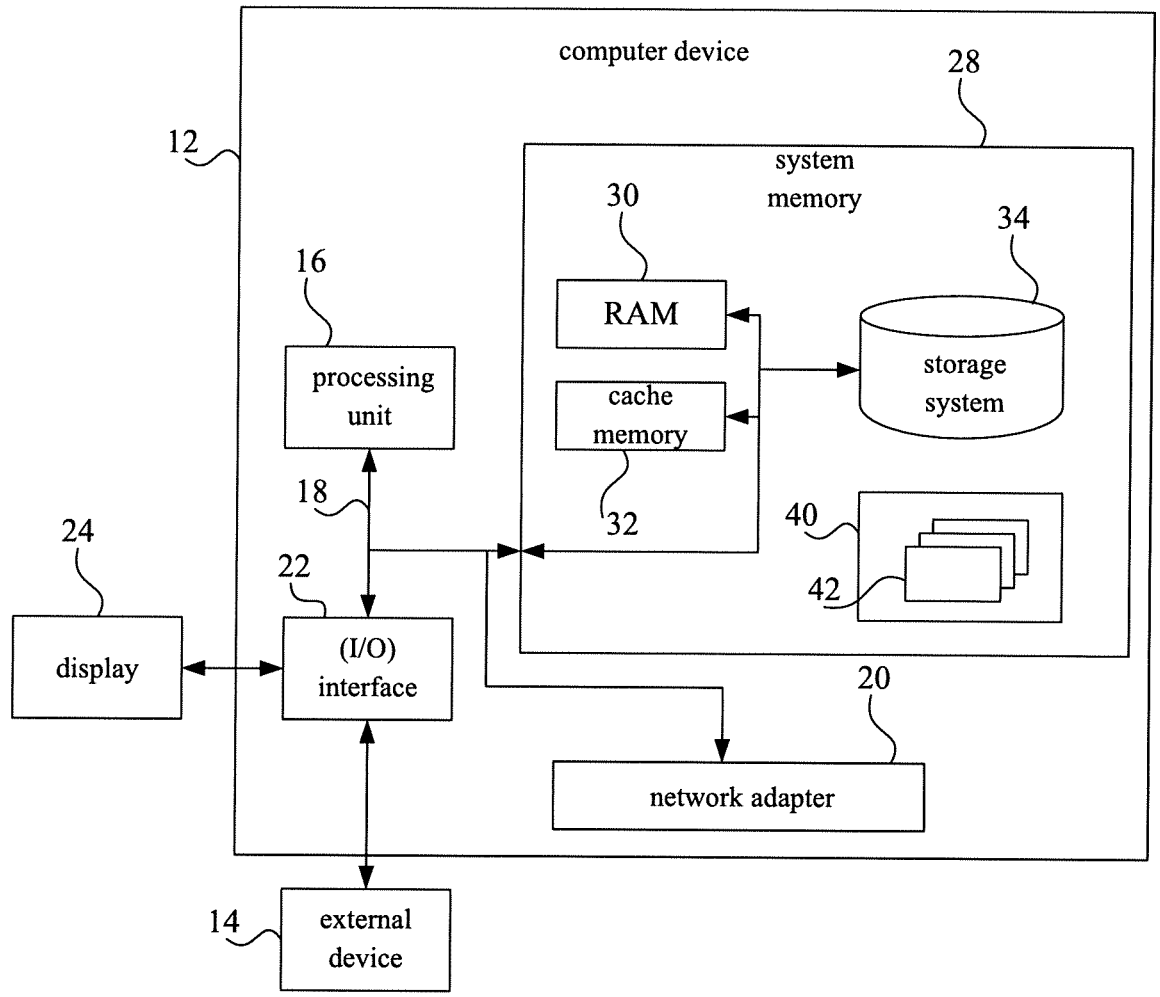
FIG. 6 is a block diagram of an example computer device suitable for implementing embodiments of the present disclosure.

FIG. 6 is a block diagram of an example computer device suitable for implementing embodiments of the present disclosure. A computer device 12 shown in FIG. 6 is merely an example and should not impose any limitation on the function and scope of use of the embodiments of the present disclosure.

As illustrated in FIG. 6, the computer device 12 may be represented via a general computer device form. Components of the computer device 12 may include but be not limited to one or more processors or processing units 16, a system memory 28, a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 6, commonly referred to as a "hard drive"). Although not shown, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as an Internet) through a network adapter 20. As shown, the network adapter 20 communicates with other modules of the computer device 12 over the bus 18. It should be understood that, although not shown, other hardware and/or software modules may be used in connection with the computer device 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the search processing method based on clipboard data in embodiments of the present disclosure.

Embodiments of the present disclosure further provide a storage medium including computer executable instructions. When the computer executable instructions are executed by a computer processor, the search processing method based on clipboard data in embodiments of the present disclosure is executed.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A search processing method based on clipboard data, comprises:

in response to monitoring that the first data obtained from a search box comes from a clipboard, performing an identification process on first data in the search box to obtain a plurality of second data included in the first data and a type of each second data, wherein the first data coming from the clipboard comprises different types of second data;

determining search data corresponding respectively to the plurality of second data according to the type of each second data;

displaying the search data corresponding respectively to the plurality of second data and determining target search data according to operations of a user on the search data corresponding respectively to the plurality of second data;

obtaining supplementary data associated with the target search data from a server;

displaying the supplementary data in a floating layer manner under the search box;

updating the target search data according to operations of the user on the supplementary data to obtain updated target search data; and obtaining a search result according to the updated target search data;

wherein determining the target search data according to the operations of the user comprises:

in response to detecting an operation on a search data, determining the selected search data as the target search data comprising: in response to detecting an operation on a URL, redirecting to a page corresponding to the URL, and in response to detecting an operation on a keyword, performing a search according to the keyword; and in response to detecting no operation on any search data, determining the first data as the target search data.

2. The method according to claim 1, wherein determining the search data corresponding respectively to the plurality of second data according to the type of each second data, comprises:

if the second data belongs to uniform resource locator data, determining the second data as the search data;

or, if the second data belongs to picture data, performing an image identification on the second data to determine the search data corresponding to the second data;

or when the second data belongs to character-type data, performing a word segmentation on the second data to determine the search data corresponding to the second data based on the second data and words obtained by the word segmentation and a part of speech of each word.

3. The method according to claim 2, wherein the clipboard further comprises tag data representing source information of the first data; the method further comprises:

determining expanded search data corresponding to the first data according to the source information of the first data indicated by the tag data, after monitoring that the first data obtained from the search box comes from the clipboard; and displaying the expanded search data corresponding to the first data before determining the target search data according to the operations of the user on the search data corresponding respectively to the plurality of second data.

4. The method according to claim 2, wherein performing the word segmentation on the second data to determine the search data corresponding to the second data based on the second data and words obtained by the word segmentation and a part of speech of each word comprises:

screening the words obtained by the word segmentation based on the part of speech of each word; and determining the search word based on the second data and the words after screening.

5. The method according to claim 1, before displaying the search data corresponding respectively to the plurality of second data, further comprising:

sorting the search data corresponding respectively to the plurality of second data according to an order of the plurality of second data in the first data;

or, sorting the search data according to search frequencies of the search data corresponding respectively to the plurality of second data.

6. The method according to claim 1, wherein the clipboard further comprises tag data representing source information of the first data; the method further comprises:

determining expanded search data corresponding to the first data according to the source information of the first data indicated by the tag data, after monitoring that the first data obtained from the search box comes from the clipboard; and displaying the expanded search data corresponding to the first data before determining the target search data according to the operations of the user on the search data corresponding respectively to the plurality of second data.

7. The method according to claim 1, wherein the clipboard further comprises a tag data representing source information of the first data;

the method further comprises: determining a search purpose corresponding to the first data according to the source information of the first data indicated by the tag data, after monitoring that the first data obtained from the search box comes from the clipboard, wherein the search purpose indicates a search domain to be searched, comprising an academic field and an entertainment field;

obtaining the search result according to the target search data comprises: obtaining the search result according to the search purpose and the target search data.

8. A computer device comprising a processor and a memory, wherein when the processor runs a program corresponding to an executable program code by reading the executable program code stored in the memory, the processor is caused to implement the search processing method based on clipboard data comprising:

in response to monitoring that the first data obtained from a search box comes from a clipboard, performing an identification process on first data in the search box to obtain a plurality of second data included in the first data and a type of each second data, wherein the first data coming from the clipboard comprises different types of second data;

determining search data corresponding respectively to the plurality of second data according to the type of each second data;

displaying the search data corresponding respectively to the plurality of second data and determining target search data according to operations of a user on the search data corresponding respectively to the plurality of second data;

obtaining supplementary data associated with the target search data from a server;

displaying the supplementary data in a floating layer manner under the search box;

updating the target search data according to operations of the user on the supplementary data to obtain updated target search data; and obtaining a search result according to the updated target search data;

wherein determining the target search data according to the operations of the user comprises:

in response to detecting an operation on a search data, determining the selected search data as the target search data comprising: in response to detecting an operation on a URL, redirecting to a page corresponding to the URL, and in response to detecting an operation on a keyword, performing a search according to the keyword; and in response to detecting no operation on any search data, determining the first data as the target search data.

9. The computer device according to claim 8, wherein determining the search data corresponding respectively to the plurality of second data according to the type of each second data, comprises:

if the second data belongs to uniform resource locator data, determining the second data as the search data; or, if the second data belongs to picture data, performing an image identification on the second data to determine the search data corresponding to the second data; or when the second data belongs to character-type data, performing a word segmentation on the second data to determine the search data corresponding to the second data based on the second data and words obtained by the word segmentation and a part of speech of each word.

10. The computer device according to claim 8, before displaying the search data corresponding respectively to the plurality of second data, the method further comprising:

sorting the search data corresponding respectively to the plurality of second data according to an order of the plurality of second data in the first data; or, sorting the search data according to search frequencies of the search data corresponding respectively to the plurality of second data.

11. The computer device according to claim 8, wherein the clipboard further comprises tag data representing source information of the first data;

the method further comprises:

determining expanded search data corresponding to the first data according to the source information of the first data indicated by the tag data, after monitoring that the first data obtained from the search box comes from the clipboard; and displaying the expanded search data corresponding to the first data before determining the target search data according to the operations of the user on the search data corresponding respectively to the plurality of second data.

12. The computer device according to claim 8, wherein the clipboard further comprises a tag data representing source information of the first data;

the method further comprises: determining a search purpose corresponding to the first data according to the source information of the first data indicated by the tag data, after monitoring that the first data obtained from the search box comes from the clipboard, wherein the search purpose indicates a search domain to be searched, comprising an academic field and an entertainment field;

obtaining the search result according to the target search data comprises: obtaining the search result according to the search purpose and the target search data.

13. A non-transitory computer readable storage medium, having computer programs stored thereon, wherein when the computer programs are executed by a processor, the processor is caused to implement the search processing method based on clipboard data comprising:

in response to monitoring that the first data obtained from a search box comes from a clipboard, performing an identification process on first data in the search box to obtain a plurality of second data included in the first data and a type of each second data, wherein the first data coming from the clipboard comprises different types of second data;

determining search data corresponding respectively to the plurality of second data according to the type of each second data;

displaying the search data corresponding respectively to the plurality of second data and determining target search data according to operations of a user on the search data corresponding respectively to the plurality of second data;

obtaining supplementary data associated with the target search data from a server;

displaying the supplementary data in a floating layer manner under the search box;

updating the target search data according to operations of the user on the supplementary data to obtain updated target search data; and obtaining a search result according to the updated target search data;

wherein determining the target search data according to the operations of the user comprises:

in response to detecting an operation on a search data, determining the selected search data as the target search data comprising: in response to detecting an operation on a URL, redirecting to a page corresponding to the URL, and in response to detecting an operation on a keyword, performing a search according to the keyword; and in response to detecting no operation on any search data, determining the first data as the target search data.

14. The non-transitory computer readable storage medium according to claim 13, wherein determining the search data corresponding respectively to the plurality of second data according to the type of each second data, comprises:

if the second data belongs to uniform resource locator data, determining the second data as the search data;

or, if the second data belongs to picture data, performing an image identification on the second data to determine the search data corresponding to the second data;

or when the second data belongs to character-type data, performing a word segmentation on the second data to determine the search data corresponding to the second data based on the second data and words obtained by the word segmentation and a part of speech of each word.

15. The non-transitory computer readable storage medium according to claim 13, before displaying the search data corresponding respectively to the plurality of second data, the method further comprising:

sorting the search data corresponding respectively to the plurality of second data according to an order of the plurality of second data in the first data;

or, sorting the search data according to search frequencies of the search data corresponding respectively to the plurality of second data.

16. The non-transitory computer readable storage medium according to claim 13, wherein the clipboard further comprises tag data representing source information of the first data; the method further comprises:

determining expanded search data corresponding to the first data according to the source information of the first data indicated by the tag data, after monitoring that the first data obtained from the search box comes from the clipboard; and displaying the expanded search data corresponding to the first data before determining the target search data according to the operations of the user on the search data corresponding respectively to the plurality of second data.

17. The non-transitory computer readable storage medium according to claim 13, wherein the clipboard further comprises a tag data representing source information of the first data;

the method further comprises: determining a search purpose corresponding to the first data according to the source information of the first data indicated by the tag data, after monitoring that the first data obtained from the search box comes from the clipboard, wherein the search purpose indicates a search domain to be searched, comprising an academic field and an entertainment field;

obtaining the search result according to the target search data comprises: obtaining the search result according to the search purpose and the target search data.

\* \* \* \* \*